United States Patent
Song et al.

(10) Patent No.: US 9,733,520 B2
(45) Date of Patent: Aug. 15, 2017

(54) DISPLAY PANEL AND METHOD OF MANUFACTURING THE SAME

(71) Applicant: Samsung Display Co., Ltd., Yongin, Gyeonggi-Do (KR)

(72) Inventors: Sang-Hyeon Song, Seoul (KR); Il-Gon Kim, Seoul (KR); Mee-Hye Jung, Suwon-si (KR); Se-Hyoung Cho, Hwaseong-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 239 days.

(21) Appl. No.: 14/227,485

(22) Filed: Mar. 27, 2014

(65) Prior Publication Data
US 2015/0029430 A1    Jan. 29, 2015

(30) Foreign Application Priority Data

Jul. 23, 2013  (KR) .................... 10-2013-0086415

(51) Int. Cl.
| | |
|---|---|
| *G02F 1/136* | (2006.01) |
| *G02F 1/1343* | (2006.01) |
| *G02F 1/1337* | (2006.01) |
| *G02F 1/1368* | (2006.01) |
| *G02F 1/1362* | (2006.01) |

(52) U.S. Cl.
CPC ...... *G02F 1/133707* (2013.01); *G02F 1/1368* (2013.01); *G02F 1/134336* (2013.01); *G02F 1/13624* (2013.01); *G02F 1/136286* (2013.01); *G02F 2001/134318* (2013.01); *G02F 2001/134345* (2013.01)

(58) Field of Classification Search
USPC .................................................. 349/144, 48
See application file for complete search history.

(56) References Cited

U.S. PATENT DOCUMENTS

| | | | |
|---|---|---|---|
| 8,107,044 B2 | 1/2012 | Choi et al. | |
| 2005/0184940 A1* | 8/2005 | Oh ...................... | G09G 3/3614 345/87 |
| 2008/0094558 A1* | 4/2008 | Wang ................ | G02F 1/133707 349/123 |
| 2009/0135321 A1* | 5/2009 | Su ..................... | G02F 1/134336 349/37 |
| 2011/0157537 A1 | 6/2011 | Chen et al. | |
| 2012/0154727 A1 | 6/2012 | Chang et al. | |

FOREIGN PATENT DOCUMENTS

| | | |
|---|---|---|
| KR | 1020040013495 A | 2/2004 |
| KR | 1020070049882 A | 5/2007 |
| KR | 1020090041799 A | 4/2009 |

\* cited by examiner

*Primary Examiner* — Wen-Ying P Chen
(74) *Attorney, Agent, or Firm* — Cantor Colburn LLP

(57) ABSTRACT

A display panel includes a gate line, a first data line crossing the gate line, a first voltage applied to the first data line, a second data line in parallel with the first data line and spaced apart from the first data line, a second voltage different from the first voltage applied to the second data line, a first thin film transistor electrically connected to the first data line, a second thin film transistor electrically connected to the second data line, a first pixel electrode electrically connected to the first thin film transistor, and disposed between the first data line and the second data line, and a second pixel electrode electrically connected to the second thin film transistor, and disposed opposite to the first pixel electrode with reference to the second data line.

18 Claims, 12 Drawing Sheets

FIG. 3
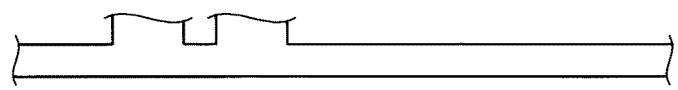
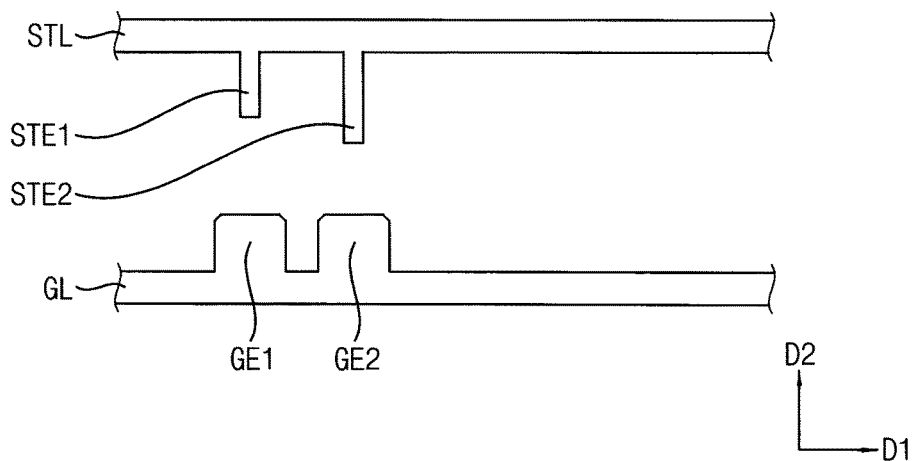

DISPLAY PANEL AND METHOD OF MANUFACTURING THE SAME

This application claims priority to Korean Patent Application No. 10-2013-0086415, filed on Jul. 23, 2013, and all the benefits accruing therefrom under 35 U.S.C. §119, the contents of which are incorporated by reference herein in its entirety.

BACKGROUND

1. Field

Exemplary embodiments of the invention relate to a display panel and a method of manufacturing the display panel.

More particularly, exemplary embodiments of the invention relate to a display panel for a liquid crystal display apparatus and a method of manufacturing the display panel.

2. Description of the Related Art

Recently, a liquid crystal display ("LCD") apparatus having light weight and small size has been manufactured. A cathode ray tube ("CRT") display apparatus has been used due to a performance and a competitive price. However the CRT display apparatus has a weakness in size or portability. Therefore the LCD apparatus has been highly regarded due to small size, light weight and low-power-consumption of the LCD apparatus.

The LCD apparatus includes an array substrate including a pixel electrode, an opposite substrate facing the array substrate and including a common electrode and a liquid crystal layer disposed between the array substrate and the opposite substrate. The LCD apparatus may have various structures to improve a viewing angle.

SUMMARY

Traditional structures of a liquid crystal display ("LCD") apparatus may not have sufficient transmittance and aperture ratio.

One or more exemplary embodiment of the invention provides a display panel capable of improving an aperture ratio and a transmittance.

One or more exemplary embodiments of the invention also provides a method of manufacturing the display panel.

According to an exemplary embodiment of the invention, a display panel includes a gate line, a first data line crossing the gate line, a first voltage applied to the first data line, a second data line in parallel with the first data line and spaced apart from the first data line, a second voltage different from the first voltage applied to the second data line, a first thin film transistor ("TFT") electrically connected to the first data line, a second TFT electrically connected to the second data line, a first pixel electrode electrically connected to the first TFT and disposed between the first data line and the second data line, and a second pixel electrode electrically connected to the second TFT, and disposed opposite to the first pixel electrode with reference to the second data line.

In an exemplary embodiment, a plurality of slit openings arranged in a length direction of the second data line may be defined in the first pixel electrode. A plurality of slit openings arranged in a length direction of the second data line may be defined in the second pixel electrode.

In an exemplary embodiment, the display panel may further include a common electrode overlapping the first and second pixel electrodes. A first slit opening line corresponding to the first pixel electrode and extending in the length direction of the second data line and a second slit opening line corresponding to the second pixel electrode and extending in the length direction of the second data line may be defined in the common electrode.

In an exemplary embodiment, a plurality of first slit openings disposed between the slit openings of the first pixel electrode and a plurality of second slit openings disposed between the plurality of slit openings of the second pixel electrode may be defined in the common electrode.

In an exemplary embodiment, a third slit opening line overlapping the second data line may be defined in the common electrode.

In an exemplary embodiment, a first pixel may be defined by an area of the first pixel electrode. A second pixel may be defined by an area of the second pixel electrode. The first pixel may include a plurality of domains divided by the plurality of slit openings of the first pixel electrode, the first slit opening line of the common electrode and the plurality of first slit openings of the common electrode. The second pixel may include a plurality of domains divided by the plurality of slit openings of the second pixel electrode, the second slit opening line of the common electrode and the plurality of second slit openings of the common electrode.

In an exemplary embodiment, the first pixel may be divided into a plurality of unit domains by the plurality of slit openings of the first pixel electrode. The second pixel may be divided into a plurality of unit domains by the plurality of slit openings of the second pixel electrode.

In an exemplary embodiment, the display panel may further include a liquid crystal layer including liquid crystal molecules and disposed between the first and second pixel electrodes and the common electrode. A unit domain of the first pixel may be divided into first to fourth domains by the first slit opening line and the plurality of first slit openings of the common electrode. A unit domain of the second pixel may be divided into first to fourth domains by the second slit opening line and the plurality of second slit openings of the common electrode. Director directions of the liquid crystal molecules in each of the first to fourth domains of the unit domain of the first pixel may be different from each other, or director directions of liquid crystal molecules in each of the first to fourth domains of the unit domain of the second pixel are different from each other.

In an exemplary embodiment, the director directions of the first to fourth domains may be changed in counter clock wise in an order of the first to fourth domains of the first to fourth domains of the unit domain of the first pixel, or the director directions of each of the first to fourth domains of the unit domain of the second pixel are changed in counter clock wise in an order of the first to fourth domains of the unit domain of the second pixel.

In an exemplary embodiment, each of the first to fourth domains may have a square shape.

In an exemplary embodiment, the first and second pixel electrodes may include a plurality of edge openings corresponding to each of the domains.

In an exemplary embodiment, the second data line may be spaced apart from a center of a unit pixel toward the first data line. An area of the first pixel electrode and an area of the second pixel electrode may be different from each other.

In an exemplary embodiment, an area ratio of the first pixel electrode and the second pixel electrode may be about 1:1.5 to about 1:2.

In an exemplary embodiment, the first pixel electrode may include a first portion adjacent to the first TFT, and a second portion opposite to the first portion with reference to the first TFT. The first portion and the second portions of the first pixel electrode may be electrically connected each other.

In an exemplary embodiment, the first slit opening line and the plurality of first slit opening of the common electrode may have a cross (+) shape.

In an exemplary embodiment, the first voltage may be lower than the second voltage.

In an exemplary embodiment, the second pixel electrode may be disposed adjacent to the first data line of an adjacent unit pixel.

According to another exemplary embodiment of the invention, a method of manufacturing a display panel includes forming a first data line and a second data line in parallel with the first data line on a first base substrate, forming a first TFT electrically connected to the first data line, and a second TFT electrically connected to the second data line, forming a first pixel electrode electrically connected to the first TFT, and a second pixel electrode electrically connected to the second TFT, the first pixel electrode disposed between the first data line and the second data line, the second pixel electrode being opposite to the first pixel electrode with reference to the second data line, forming a common electrode on a second base substrate, and forming a liquid crystal layer between the first and second pixel electrodes and the common electrode.

In an exemplary embodiment, forming the first and second pixel electrodes may include forming a transparent conductive layer on the first base substrate on which the first and second data lines and the first and second TFT, and defining the slit openings in the first and second pixel electrodes by patterning the transparent conductive layer.

In an exemplary embodiment, forming the common electrode may include forming a transparent conductive layer on the second base substrate, defining a first slit opening line overlapping the first pixel electrode, a plurality of first slit openings crossing the first slit opening line, a second slit opening line overlapping the second pixel electrode and plurality of second slit openings crossing the second slit opening line in the common electrode by patterning the transparent conductive layer.

According to the invention, a display panel includes a first pixel electrode and a second pixel electrode divided by a second data line, so that a first data line of an adjacent pixel may be disposed adjacent to the second pixel electrode. In addition, a plurality of slit openings or slit opening line is defined in the first pixel electrode, the second pixel electrode and a common electrode. Thus, an aperture ratio and a transmittance of the display panel may be improved.

In addition, the display panel includes the first and second pixel electrode to which different voltages are applied, so that displaying quality of the display panel may be improved.

In addition, the display panel includes first to fourth domains having different director directions, so that the displaying quality of the display panel may be improved.

In addition, a plurality of edge openings is defined in the first and second pixel electrodes, so that the displaying quality of the display panel may be improved.

BRIEF DESCRIPTION OF THE DRAWINGS

The above and other exemplary embodiments, advantages and features of the invention will become more apparent by describing in detail exemplary embodiments thereof with reference to the accompanying drawings, in which:

FIGS. 3 to 7 are plan views illustrating a method of manufacturing the display panel of FIG. 1;

DETAILED DESCRIPTION

Figure 1:
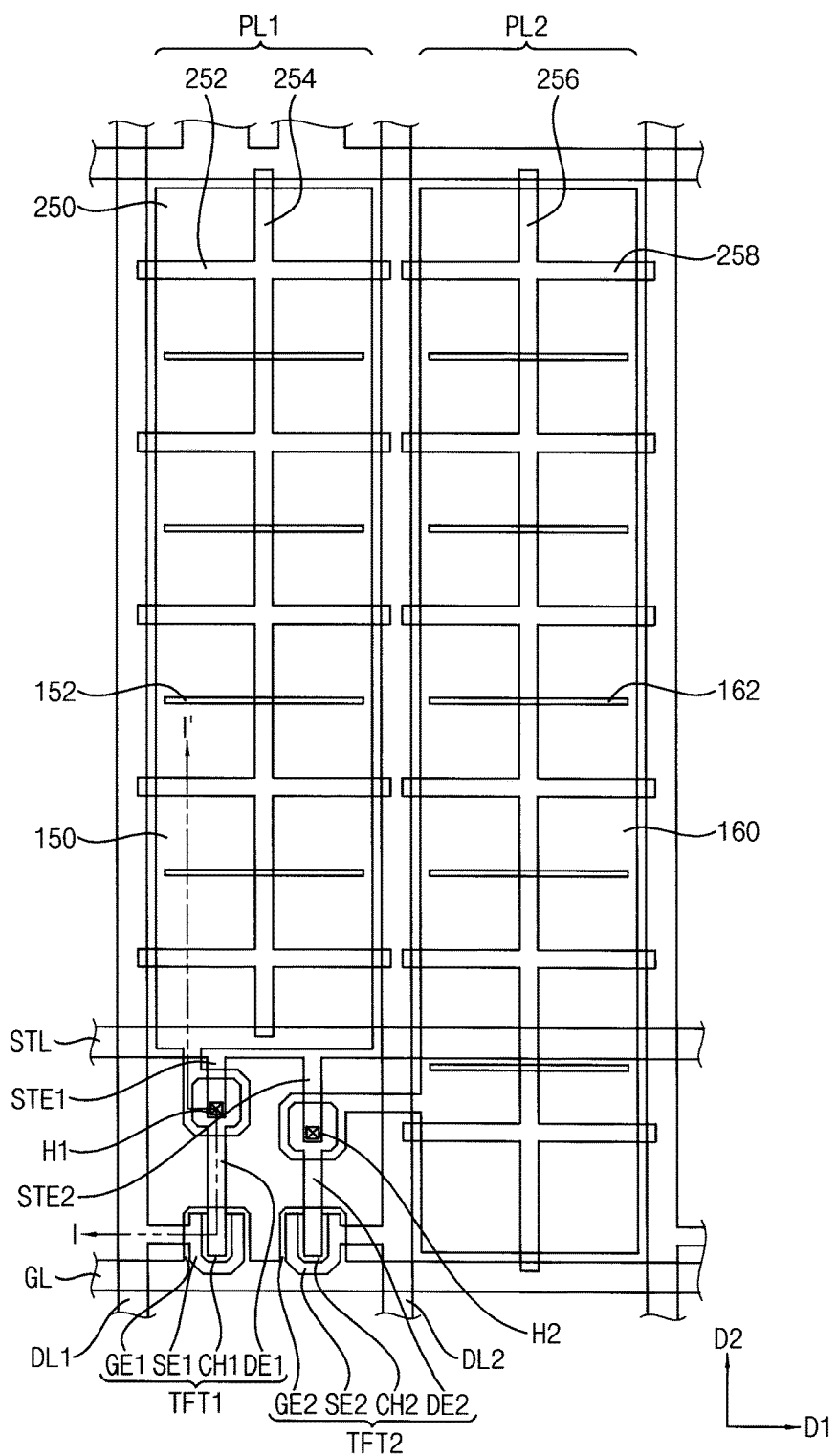
FIG. 1 is a plan view illustrating an exemplary embodiment of a unit pixel of a display panel according to the invention.

Hereinafter, the invention will be explained in detail with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
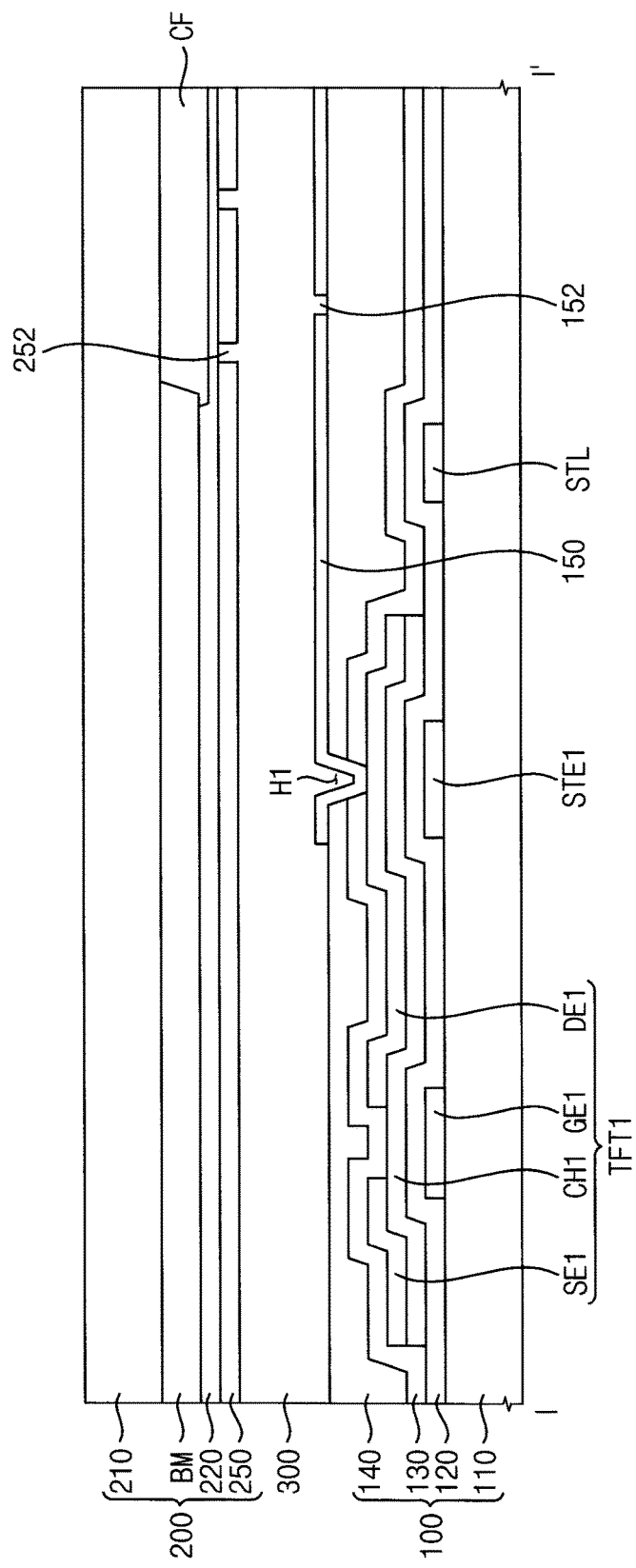
FIG. 2 is a cross-sectional view taken along line I-I' of FIG. 1.

FIG. 1 is a plan view illustrating a unit pixel of a display panel according to an exemplary embodiment of the invention. FIG. 2 is a cross-sectional view taken along line I-I' of FIG. 1

Referring to FIGS. 1 and 2, a display panel includes an array substrate 100, an opposite substrate 200 facing the array substrate 100 and a liquid crystal layer 300 disposed between the array substrate 100 and the opposite substrate 200.

The array substrate 100 includes a first base substrate 110, a gate line GL, a storage line STL, a first insulation layer 120, a first data line DL1, a second data line DL2, a second insulation layer 130, a first thin film transistor TFT1, a second thin film transistor TFT2, a planarizing layer 140, a first pixel electrode 150 and a second pixel electrode 160.

The gate line GL is disposed on the first base substrate 110. The gate line GL extends in a first direction D1. The first base substrate 110 may include a material which has relatively high transmittance, thermal resistance and chemical resistance. In an exemplary embodiment, the base substrate 110 may include any one selected from glass, polyethylenenaphthalate, polyethylene terephthalate, polyacryl and a combination thereof, for example.

The gate line GL is electrically connected to a first gate electrode GE1. In an exemplary embodiment, the first gate electrode GE1 is protruded from the gate line GL in a second direction D2 which is perpendicular to the first direction D1, for example. In addition, the gate line GL is electrically connected to a second gate electrode GE2. In an exemplary embodiment, the second gate electrode GE2 is protruded from the gate line GL in the second direction D2, and is spaced apart from the first gate electrode GE1, for example.

The storage line STL is disposed on the first base substrate 110, and extends in the first direction D1. The storage line STL is spaced apart from and in parallel with the gate line GL. A first storage electrode STE1 and a second storage electrode STE2 are electrically connected to the storage line STL. In an exemplary embodiment, the first storage electrode STE1 may be protruded from the storage line STL in the second direction D2, for example. In addition, the second storage electrode STE2 may be protruded from the storage line STL in the second direction D2, and be spaced apart from the first storage electrode STE1.

The first insulation layer 120 is disposed on the first base substrate 110 on which the gate line GL and the storage line STL are disposed. In an exemplary embodiment, the first insulation layer 120 may include silicon oxide, metal oxide and etc.

A first channel layer CH1 is disposed on the first insulating layer 120 and overlaps the first gate electrode GE1. A second channel layer CH2 is disposed on the first insulating layer 120 and overlaps the second gate electrode GE2. In an exemplary embodiment, the first and second channel layer CH1 and CH2 may include a semiconductor layer including amorphous silicon (a-Si:H) and an ohmic contact layer including n+ amorphous silicon (n+a-Si:H). In addition, the first and second channel layer CH1 and CH2 may include an oxide semiconductor. In an exemplary embodiment, the oxide semiconductor may include an amorphous oxide including at least one selected from indium (In), zinc (Zn), gallium (Ga), tin (Sn), hafnium (Hf) and any combinations thereof, for example.

The first data line DL1 and the second data line DL2 are disposed on the first and second channel layer CH1 and CH2. The first data line DL1 extends in the second direction D2. The first data line DL1 is electrically connected to a first source electrode SE1. A first drain electrode DE1 is spaced apart from the first source electrode SE1, and disposed on the first channel layer CH1. The first drain electrode DE1 partially overlaps the first storage electrode STE1.

The second data line DL2 extends in the second direction D2, and is spaced apart from the first data line DL1. The second data line DL2 is electrically connected to a second source electrode SE2. A second drain electrode DE2 is spaced apart from the second source electrode SE2, and disposed on the second channel layer CH2. The second drain electrode DE2 partially overlaps the second storage electrode STE2.

The first gate electrode GE1, the first source electrode SE1, the first drain electrode DE1 and the first channel layer CH1 compose the first thin film transistor TFT1.

The second gate electrode GE2, the second source electrode SE2, the second drain electrode DE2 and the second channel layer CH2 compose the second thin film transistor TFT2.

The second data line DL2 may divide a unit pixel into two areas. Thus, the second data line DL2 may be disposed between a first pixel PL1 and a second pixel PL2 of the unit pixel. In an exemplary embodiment, the first pixel PL1 may be adjacent to a side of the second data line DL2, and the second pixel PL2 may be disposed opposite to the first pixel PL1 with reference to the second data line DL2.

The second insulation layer 130 is disposed on the first insulation layer 120 on which the first thin film transistor TFT1, the second thin film transistor TFT2, the first data line DL1 and the second data line DL2 are disposed. In an exemplary embodiment, the second insulation layer 130 may include inorganic material such as silicon oxide (SiOx) and silicon nitride (SiNx). In addition, the second insulation layer 130 may include organic insulating material having relatively low permittivity. In addition, the second insulation layer 130 may have a double layer structure of inorganic and organic insulating layers.

A first contact hole H1 exposing the first drain electrode DE1 and a second contact hole H2 exposing the second drain electrode DE2 are defined in the second insulation layer 130.

The first pixel electrode 150 and the second pixel electrode 160 are disposed on the second insulation layer 130. The first pixel electrode 150 is electrically connected to the first thin film transistor TFT1 through the first contact hole H1. The second pixel electrode 160 is electrically connected to the second thin film transistor TFT2 through the second contact hole H2. In an exemplary embodiment, the first and second pixel electrodes 150 and 160 may include a transparent conductive material, such as indium tin oxide ("ITO"), indium zinc oxide ("IZO") and etc.

The first pixel electrode 150 is disposed adjacent to the second data line DL2 in a plan view. The second pixel electrode 160 is disposed opposite to the first pixel electrode 150 with reference to the second data line DL2. Thus, the first pixel electrode 150 corresponds to the first pixel electrode PL1, and the second pixel electrode 160 corresponds to the second pixel electrode PL2.

A plurality of slit openings 152 may be defined in the first pixel electrode 150. The slit openings 152 extend in the first direction D1, and are arranged in the second direction D2 by a predetermined distance.

A plurality of slit openings 162 may be defined in the second pixel electrode 160. The slit openings 162 extend in the first direction D1, and are arranged in the second direction D2 by a predetermined distance.

A first voltage may be applied to the first pixel electrode 150 through the first thin film transistor TFT1. In an exemplary embodiment, a second voltage different from the first voltage may be applied to the second pixel electrode 160 through the second thin film transistor TFT2. In an exemplary embodiment, the first voltage is higher than the second voltage, the first voltage is applied to the first data line DL1 and the second voltage is applied to the second data line DL2. Thus, the first pixel PL1 is driven as a high pixel, and the second pixel PL2 is driven as a low pixel.

The opposite substrate 200 includes a second base substrate 210, a black matrix BM, a color filter CF, an over-coating later 220 and a common electrode 250.

The black matrix BM blocking light is disposed on the second base substrate 210. The second base substrate 210 may include a material which has relatively high transmittance, thermal resistance and chemical resistance. In an exemplary embodiment, the second base substrate 210 may include any one selected from glass, polyethylenenaphthalate, polyethylene terephthalate, polyacryl and a combination thereof, for example.

The black matrix BM overlaps the first and second data lines DL1 and DL2, the gate line GL, the first and second thin film transistors TFT1 and TFT2 and the storage line STL.

The color filter CF is disposed on the second base substrate 210 on which the black matrix BM is disposed. The color filter CF supplies colors to the light passing through the liquid crystal layer 300. In an exemplary embodiment, the color filter CF may include a red color filter, a green color filter and blue color filter, for example. The color filter CF corresponds to the pixel area. In an exemplary embodiment, the color filters adjacent to each other may have different colors. In an exemplary embodiment, the color filter CF may be overlapped with adjacent color filter CF in a boundary of the pixel area. In addition, the color filter CF may be spaced apart from adjacent color filter CF in the boundary of the pixel area.

The over-coating layer 220 is disposed on the color filter CF and the black matrix BM. The over-coating layer 220 flattens, protects and insulates the color filter CF. In an exemplary embodiment, the over-coating layer 220 may include acrylic-epoxy material, for example.

The common electrode 250 is disposed on the over-coating layer 220. A first slit opening line 254, a plurality of first slit openings 252 crossing the first slit opening line 254, a second slit opening line 256, and a plurality of second slit openings 258 crossing the second slit opening line 256 are defined in the common electrode 250. The first slit opening line 254 and the first slit openings 252 correspond to the first pixel PL1. The second slit opening line 256 and the second slit openings 258 correspond to the second pixel PL2. The first slit opening line 254, the first slit openings 252, second slit opening line 256 and the second slit openings 258 may divide the unit pixel into a plurality of domains with the slit openings 152 of the first pixel electrode 150 and the slit openings 162 of the second pixel electrode 160.

The liquid crystal layer 300 is disposed between the array substrate 100 and the opposite substrate 200. In an exemplary embodiment, the liquid crystal layer 300 includes liquid crystal molecules having optical anisotropy. The liquid crystal molecules are driven by electric field, so that an image is displayed by passing or blocking light through the liquid crystal layer 300.

FIGS. 3 to 7 are plan views illustrating a method of manufacturing the display panel of FIG. 1.

Referring to FIG. 3, a metal layer is disposed on a first base substrate 110 (refer to FIG. 2), and then the metal layer may be partially etched by a photolithography process or an etching process using an additional etching mask, for example. Hence, the gate pattern may be disposed on the first base substrate 110. The gate pattern includes a gate line GL, a first gate electrode GE1, a second gate electrode GE2, a storage line STL, a first storage electrode STE1, and a second storage electrode STE2.

The gate line GL extends in a first direction D1. The gate line GL is electrically connected to a first gate electrode GE1 and the second gate electrode GE2. In an exemplary embodiment, the first gate electrode GE1 and the second gate electrode GE2 are protruded from the gate line GL in a second direction D2 which is perpendicular to the first direction D1.

The storage line STL extends in the first direction D1. The storage line STL is spaced apart from and in parallel with the gate line GL. A first storage electrode STE1 and a second storage electrode STE2 are electrically connected to the storage line STL. In an exemplary embodiment, the first storage electrode STE1 and the second storage electrode STE2 may be protruded from the storage line STL in the second direction D2.

The first insulation layer 120 (refer to FIG. 2) is disposed on the first base substrate 110 on which the gate pattern is disposed. In an exemplary embodiment, the first insulation layer may be provided by a spin coating process, a printing process, a sputtering process, a chemical vapor deposition ("CVD") process, an atomic layer deposition ("ALD") process, a plasma-enhanced chemical vapor deposition ("PECVD") process, an high-density plasma chemical vapor deposition ("HDP-CVD") process or a vacuum evaporation process in accordance with ingredients included in the first insulation layer, for example.

Figure 4:
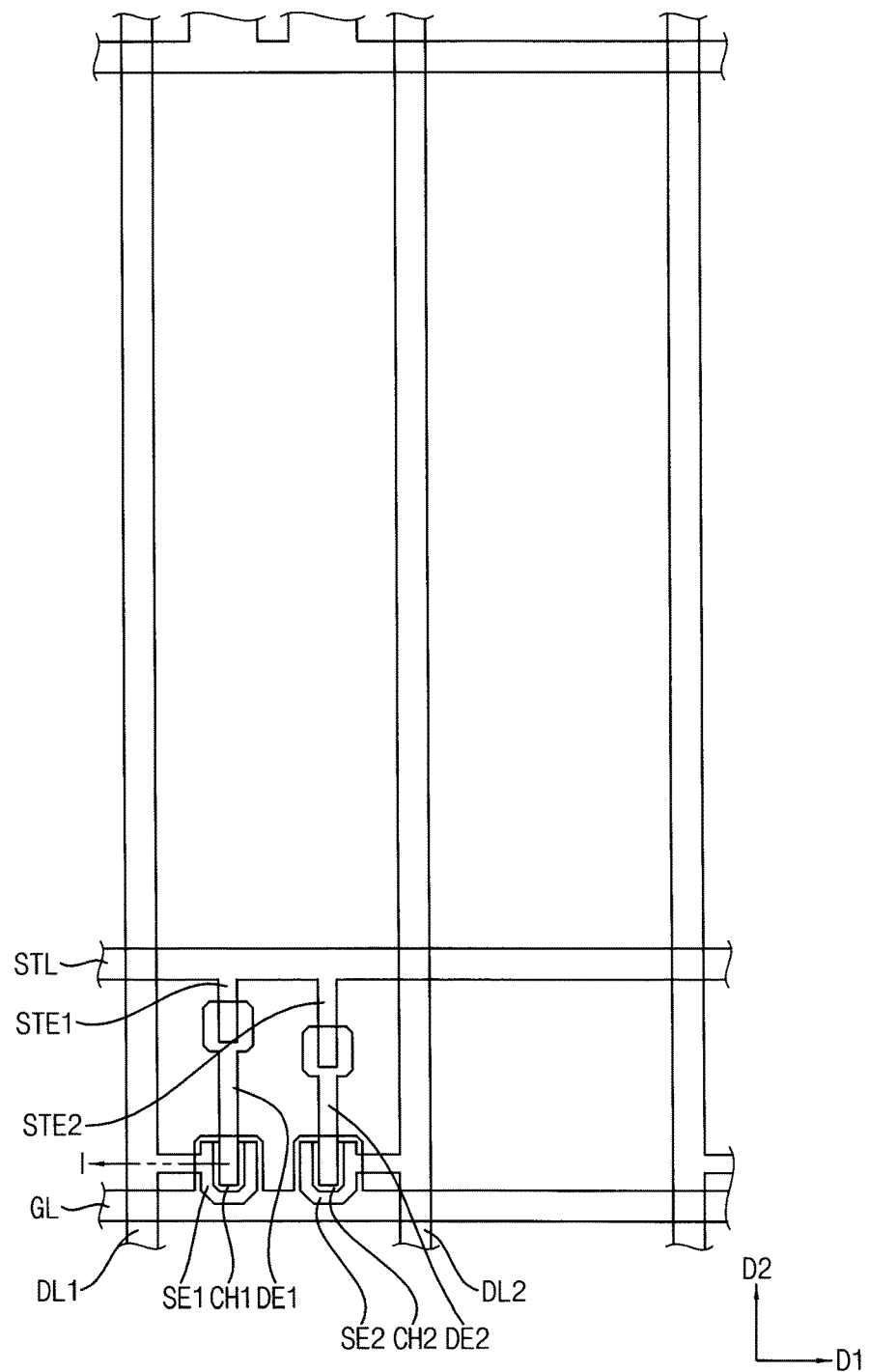

Referring to FIGS. 3 and 4, a semiconductor layer and a metal layer are disposed on the first insulation layer 120, and then the semiconductor layer and a metal layer may be partially etched by a photolithography process or an etching process using an additional etching mask. Hence, a first channel layer CH1, a second channel layer CH2 and a data pattern are disposed on the first insulation layer. The data pattern includes a first data line DL1, a first source electrode SE1, a first drain electrode DE1, a second data line DL2, a second source electrode SE2 and a second drain electrode DE2. In an exemplary embodiment, the first source electrode SE1 and the first drain electrode DE1 spaced apart from the first source electrode SE1 may be provided by patterning both of the semiconductor layer and the metal layer, and then partially removing a portion of the patterned metal layer. In addition, the second source electrode SE2 and the second drain electrode DE2 spaced apart from the second source electrode SE2 may be provided by partially removing the patterned metal layer.

The first data line DL1 extends in the second direction D2. The first data line DL1 is electrically connected to the first source electrode SE1. The second data line DL2 extends in the second direction D2, and is spaced apart from the first data line DL1. The second data line DL2 is electrically connected to a second source electrode SE2.

The first gate electrode GE1, the first source electrode SE1, the first drain electrode DE1 and the first channel layer CH1 compose the first thin film transistor TFT1.

The second gate electrode GE2, the second source electrode SE2, the second drain electrode DE2 and the second channel layer CH2 compose the second thin film transistor TFT2.

A second insulation layer 130 (refer to FIG. 2) is disposed on the first insulation layer 120 on which the data pattern is disposed. In an exemplary embodiment, the second insulation layer 130 may be provided by a spin coating process, a printing process, a sputtering process, a CVD process, an ALD process, a PECVD process, an HDP-CVD process or a vacuum evaporation process in accordance with ingredients included in the second insulation layer.

Figure 5:
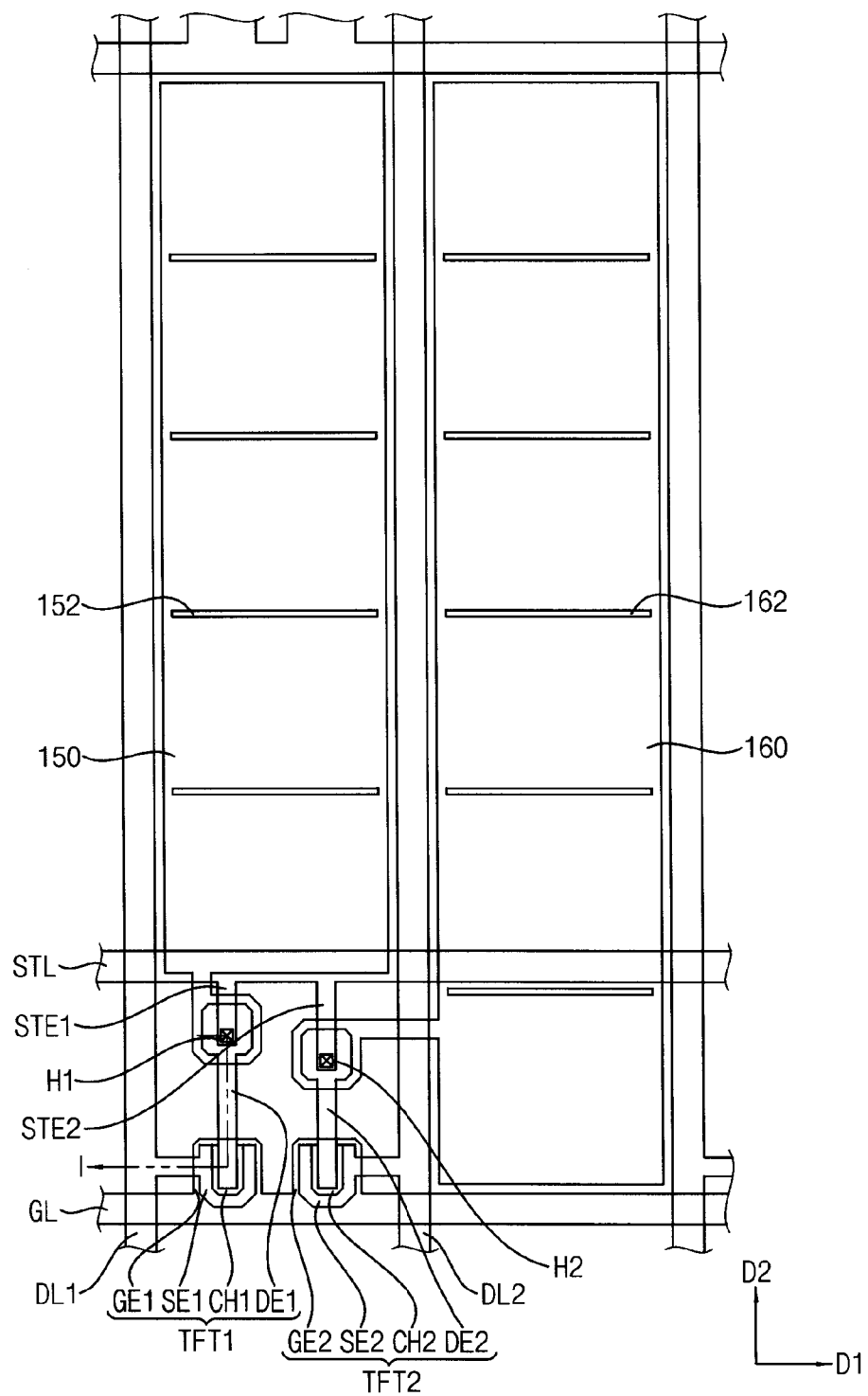

Referring to FIGS. 4 and 5, a first contact hole H1 exposing the first drain electrode DE1 is defined through the second insulation layer. A second contact hole H2 exposing the second drain electrode DE2 is defined through the second insulation layer.

A first pixel electrode 150 and a second pixel electrode 160 are disposed on the second insulation layer through which the first and second contact holes H1 and H2 are defined. A transparent conductive layer is disposed on the second insulation layer, and then the transparent conductive layer may be partially etched by a photolithography process or an etching process using an additional etching mask, for example. Hence, the first pixel electrode 150 and the second pixel electrode 160 spaced apart from the first pixel electrode 150 are provided. The first pixel electrode 150 is electrically connected to the first thin film transistor TFT1 through the first contact hole H1. The second pixel electrode 160 is electrically connected to the second thin film transistor TFT2 through the second contact hole H2.

The first pixel electrode 150 is disposed adjacent to the second data line DL2 in a plan view. The second pixel electrode 160 is disposed opposite to the first pixel electrode 150 with reference to the second data line DL2.

A plurality of slit openings 152 may be defined in the first pixel electrode 150. The slit openings 152 extend in the first direction D1, and are arranged in the second direction D2 by a predetermined distance.

A plurality of slit openings 162 may be defined in the second pixel electrode 160. The slit openings 162 extend in the first direction D1, and are arranged in the second direction D2 by a predetermined distance.

Figure 6:
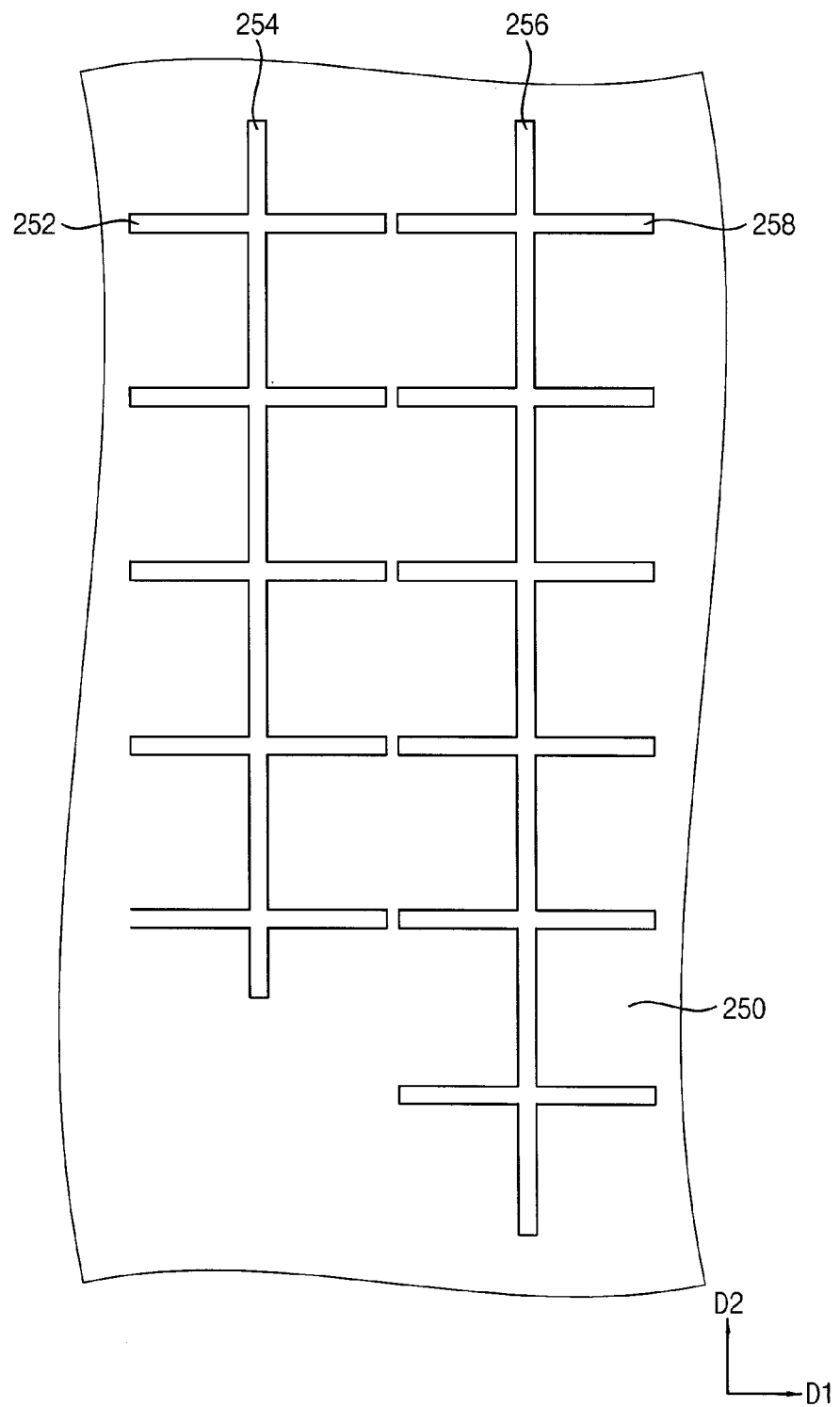

Referring to FIGS. 5 and 6, a black matrix BM (refer to FIG. 2) and a color filter CF (refer to FIG. 2) are disposed on a second base substrate 210 (refer to FIG. 2). The black matrix and the color filter are provided by a photoresist, an exposure using a mask and development using a developing solution. The over-coating layer 220 (refer to 220 of FIG. 2) is disposed on the color filter and the black matrix.

The common electrode 250 is disposed on the over-coating layer 220. A transparent conductive layer is disposed on the over-coating layer, and then the transparent conductive layer may be partially etched by a photolithography process or an etching process using an additional etching mask. Hence, the common electrode 250 is provided.

A first slit opening line 254, a plurality of first slit openings 252 crossing the first slit opening line 254, a second slit opening line 256, and a plurality of second slit openings 258 crossing the second slit opening line 256 may be defined in the common electrode 250. The first slit opening line 254 and the first slit openings 252 correspond to the first pixel PL1. The second slit opening line 256 and the second slit openings 258 correspond to the second pixel PL2.

Figure 7:
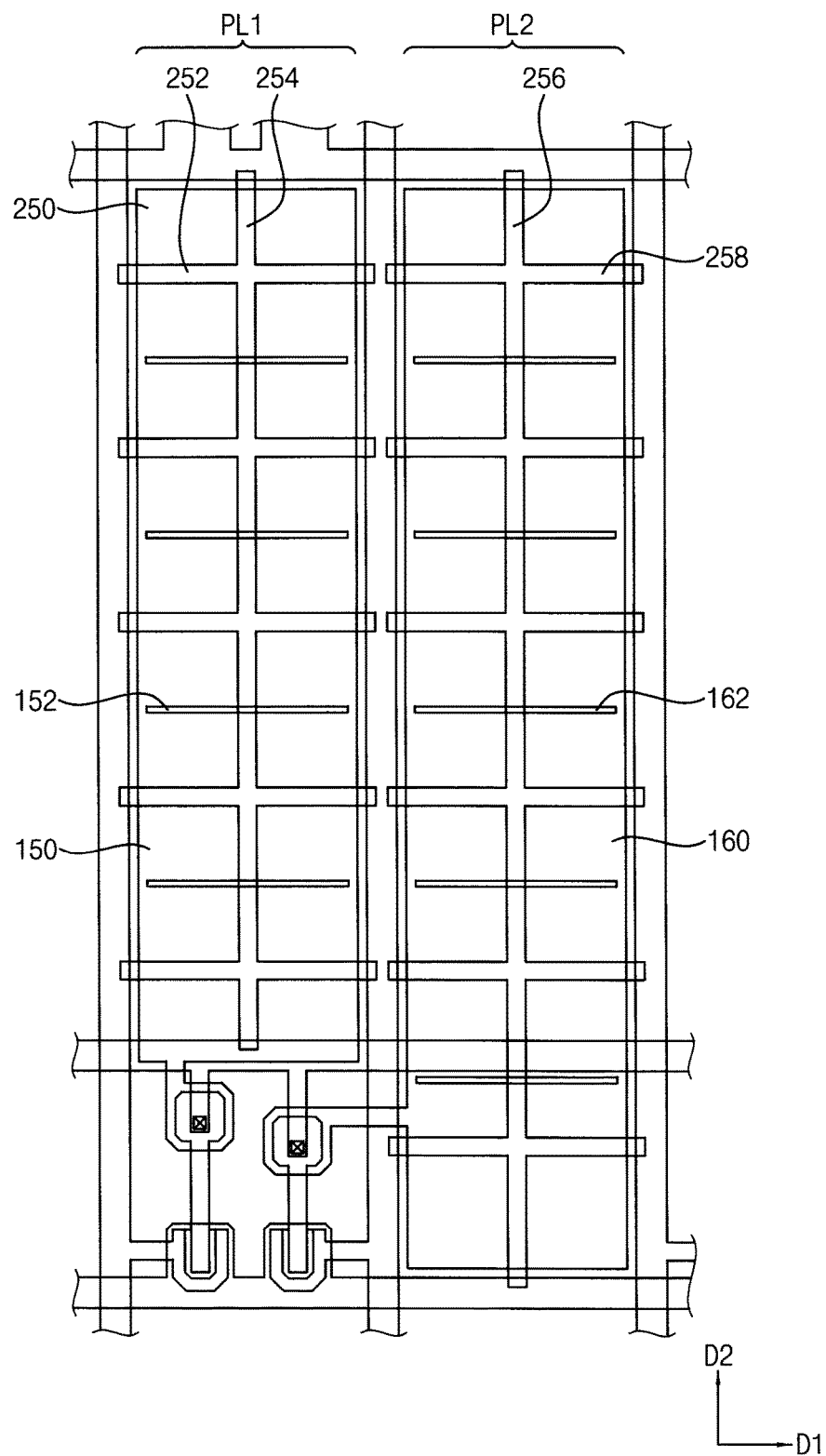

Referring to FIG. 7, a liquid crystal layer 300 including liquid crystal molecules having optical anisotropy is disposed between an array substrate 100 (refer to FIG. 2) and the opposite substrate 200 (refer to FIG. 2).

The first pixel electrode 150, the first slit opening line 254 and the first slit openings 252 correspond to the first pixel PL1. The second pixel electrode 160, the second slit opening line 256 and the second slit openings 258 correspond to the second pixel PL2.

Figure 8:
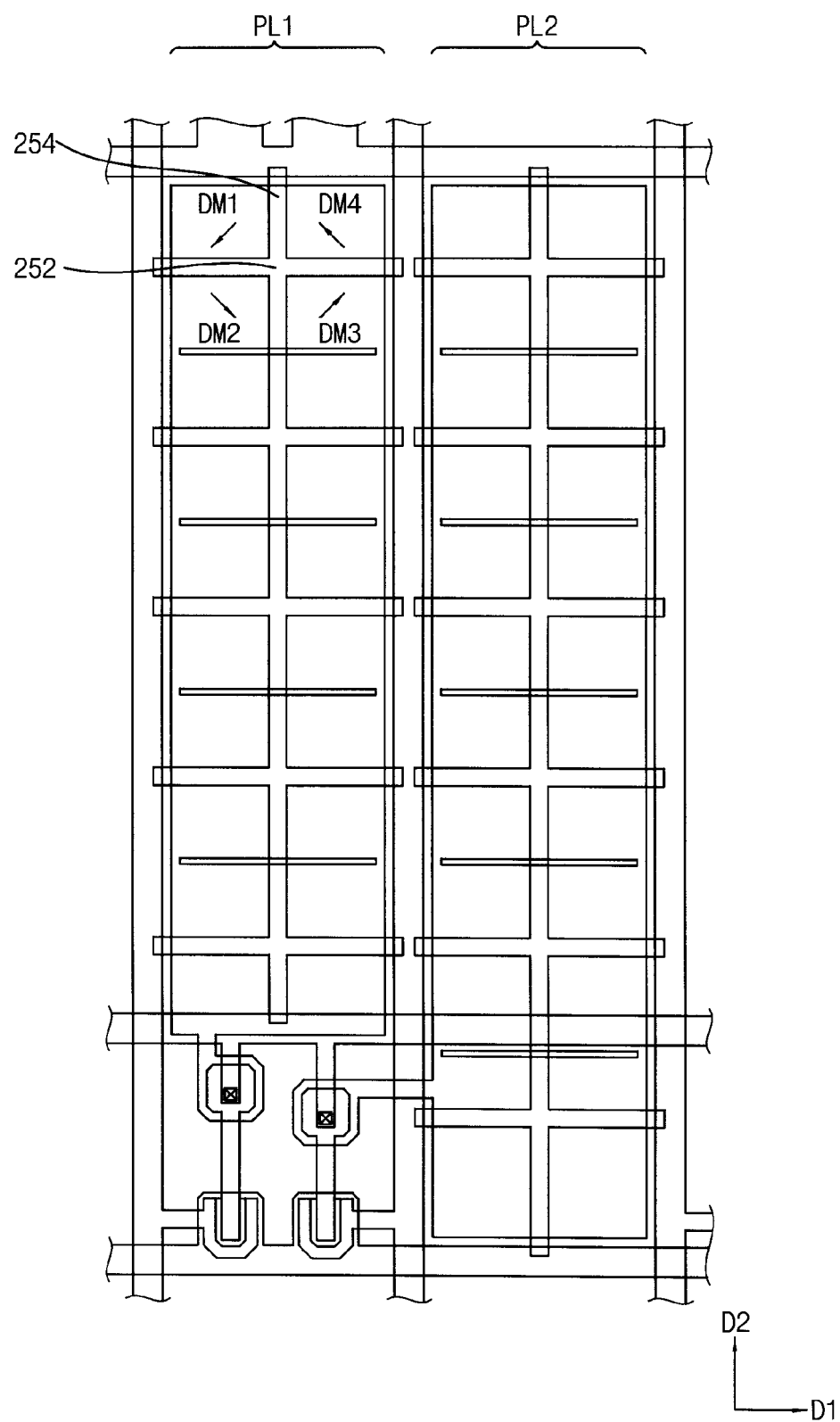
FIG. 8 is a plan view illustrating first to fourth domains of each of a unit domain of the display panel of FIG. 1.

FIG. 8 is a plan view illustrating first to fourth domains of each of a unit domain of the display panel of FIG. 1.

Referring to FIGS. 1 to 8, a unit pixel of a display panel includes a first pixel PL1 and a second pixel PL2. The first pixel PL1 and the second pixel PL2 may be driven by different voltages. The first pixel PL1 is divided into a plurality of unit domains by a plurality of slit openings 152 of the first pixel PL1. The unit domain includes first to fourth domains DM1 to DM4.

The first to fourth domains DM1 to DM4 are divided by a first slit opening line 254 and a first slit opening 252 of a common electrode 250 in the unit domain. Liquid crystal directors of a liquid crystal layer corresponding to the first to fourth domains DM1 to DM4 have different directions. In an exemplary embodiment, a director direction of each of the first to fourth domains DM1 to DM4 may change in a counter clock wise direction as illustrated in FIG. 8. In exemplary embodiments, each of the first to fourth domains DM1 to DM4 may have square shape, rectangular shape, etc.

Similarly, the second pixel PL2 is divided into a plurality of unit domains by a plurality of slit openings 162 of the second pixel electrode 160. The unit domain includes first to fourth domains DM1 to DM4 which are divided by a second slit opening line 256 and a second slit opening 258 of a common electrode 250.

Accordingly, the unit pixel includes the first and second pixel electrodes PL1 and PL2. Each of the first and second pixel electrodes PL1 and PL2 includes the unit domains, and the unit domain includes the first to fourth domains DM1 to DM4 having different director directions, so that viewing angle of the display panel may be improved.

Figure 9:
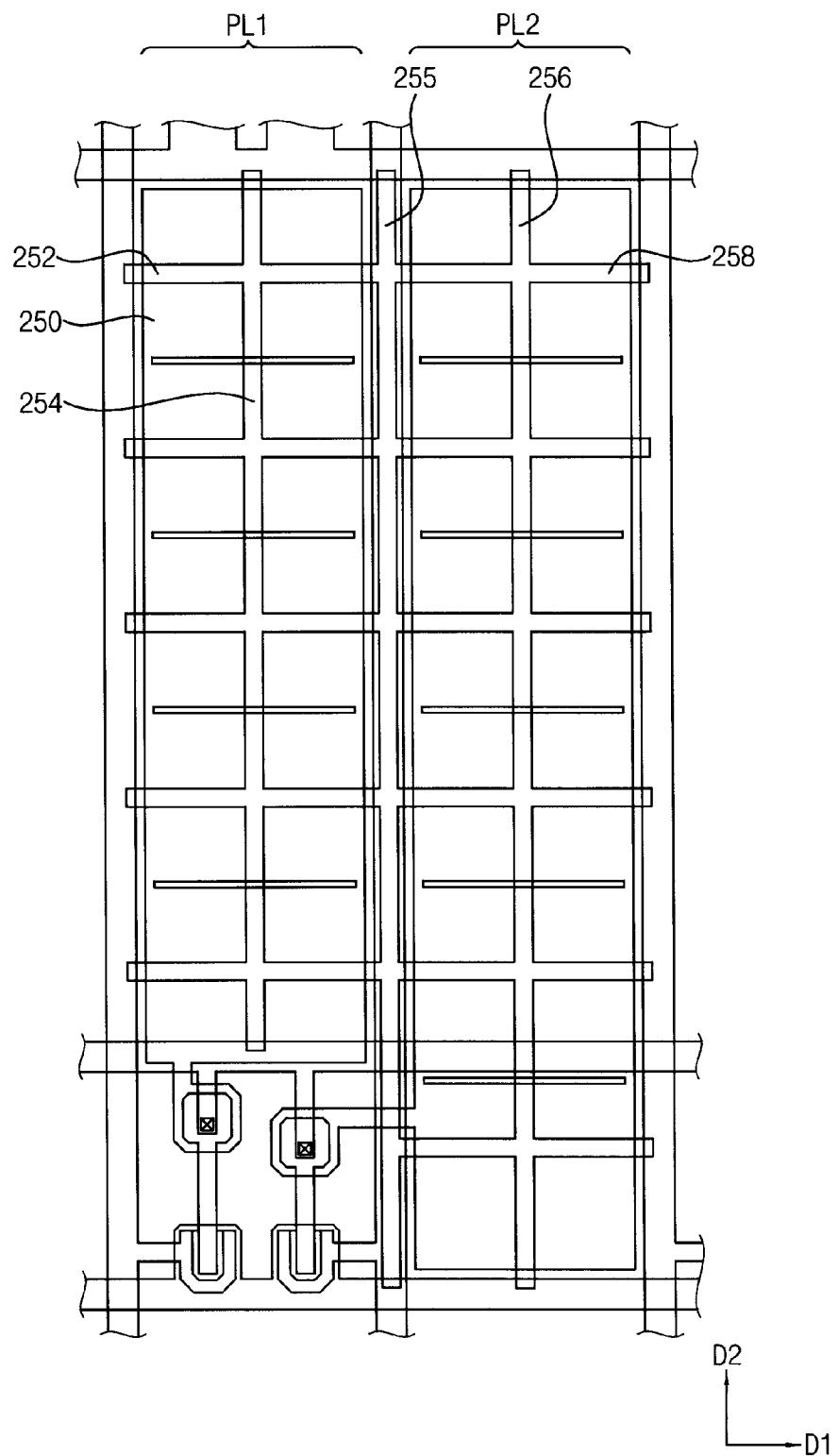
FIG. 9 is a plan view illustrating another exemplary embodiment of a unit pixel of a display panel according to the invention.

FIG. 9 is a plan view illustrating a unit pixel of a display panel according to another exemplary embodiment of the invention.

Referring to FIG. 9, a display panel is substantially same as a display panel of FIG. 1 except for a third slit opening line 255 of a common electrode 250. Thus, any further detailed descriptions concerning the same elements will be briefly explained or omitted.

A first slit opening line 254, a plurality of first slit openings 252 crossing the first slit opening line 254, a second slit opening line 256, and a plurality of second slit openings 258 crossing the second slit opening line 256 are defined in the common electrode 250. The first slit opening line 254 and the first slit openings 252 correspond to the first pixel PL1. The second slit opening line 256 and the second slit openings 258 correspond to the second pixel PL2. A third slit opening line 255 disposed between the first pixel PL1 and the second pixel PL2 is further defined in the common electrode 250. Thus, the third slit opening line 255 overlaps a second data line DL2 (refer to FIG. 1)

Although the first slit opening line 254, the first slit openings 252, the second slit opening line 256, the second slit openings 258 and the third slit opening line 255 are defined in the common electrode 250 in the illustrated exemplary embodiment, slit opening lines or slit openings which divide the first pixel PL1 and the second pixel PL2 into a plurality of domains may be defined in the common electrode 250. In addition, slit opening lines or slit openings which divide the first pixel PL1 and the second pixel PL2 into a plurality of domains may be defined in a first pixel electrode 150 (refer to FIG. 1) and a second pixel electrode 160 (refer to FIG. 1).

Figure 10:
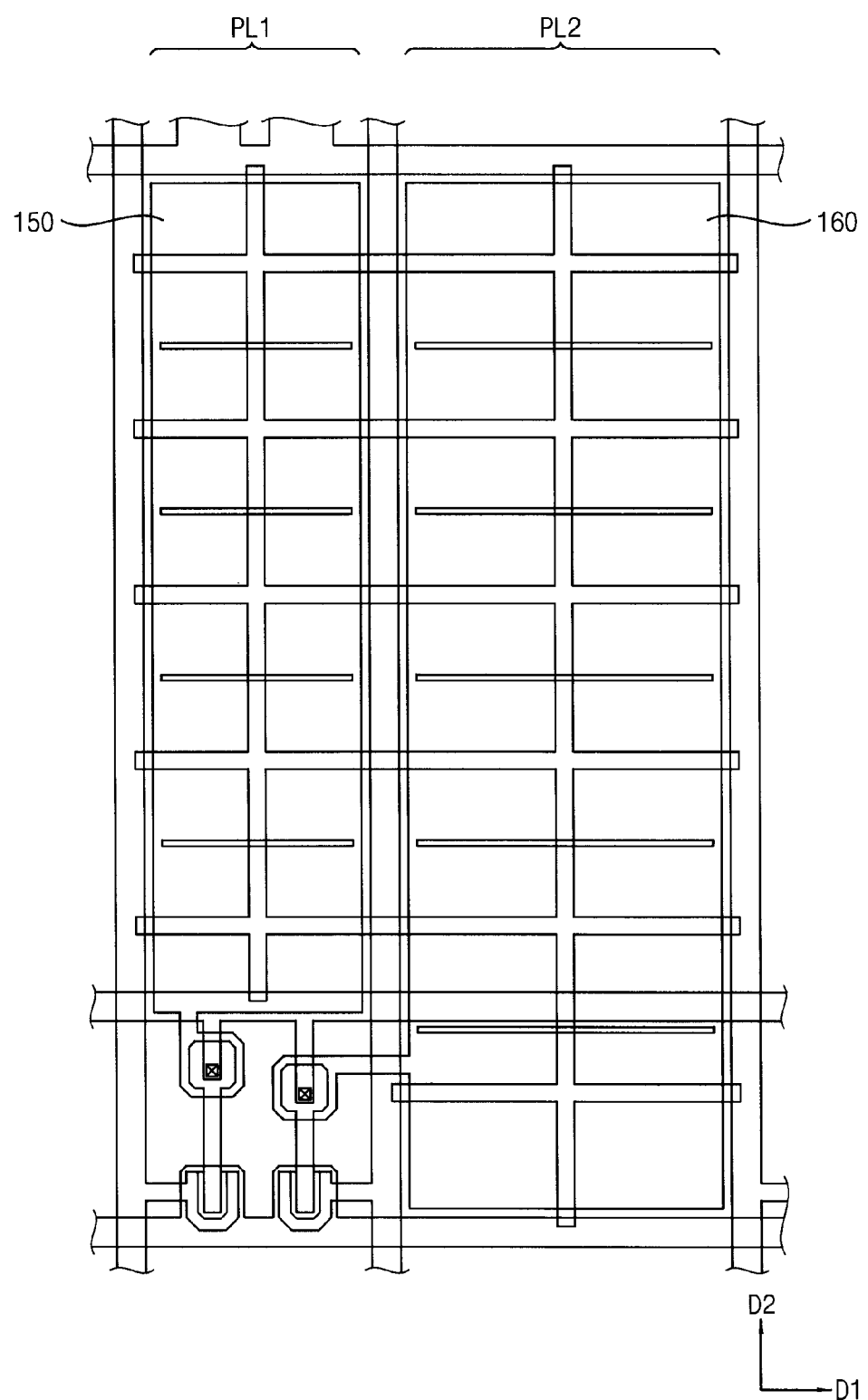
FIG. 10 is a plan view illustrating another exemplary embodiment of a unit pixel of a display panel according to the invention.

FIG. 10 is a plan view illustrating a unit pixel of a display panel according to another exemplary embodiment of the invention.

Referring to FIG. 10, a display panel is substantially same as a display panel of FIG. 1 except for an area ratio of a first pixel PL1 and a second pixel PL2. Thus, any further detailed descriptions concerning the same elements will be briefly explained or omitted.

The unit pixel of the display panel includes the first pixel PL1 and the second pixel PL2 divided by a second data line DL2 (refer to FIG. 1). A first pixel electrode 150 is provided corresponding to the first pixel PL1, and a second pixel electrode 160 is provided corresponding to the second pixel PL2. In an exemplary embodiment, an area ratio of the first pixel PL1 and the second pixel PL2 may be properly determined according to driving voltages applied to the first pixel electrode 150 and the second pixel electrode 160. In an exemplary embodiment, the area ratio of the first pixel PL1 and the second pixel PL2 may be determined according to a position of the second data line DL2. Thus, when the data line is disposed toward a first data line with reference to a center of the unit pixel, an area of the first pixel PL1 may be smaller than an area of the second pixel PL2. In an exemplary embodiment, the area ratio of the first pixel PL1 and the second pixel PL2 may be about 1:1.5 to about 1:2.

A first voltage is applied to the first pixel electrode 150 through a first data line DL1 (refer to FIG. 1), and a second voltage lower than the first voltage is applied to the second pixel electrode 160 through the second data line DL2. Thus, the first pixel PL1 is driven as a high pixel, and the second pixel PL2 is driven as a low pixel. Thus, the area ratio of the high pixel and the low pixel may be determined according to the position of the second data line DL2.

Figure 11:
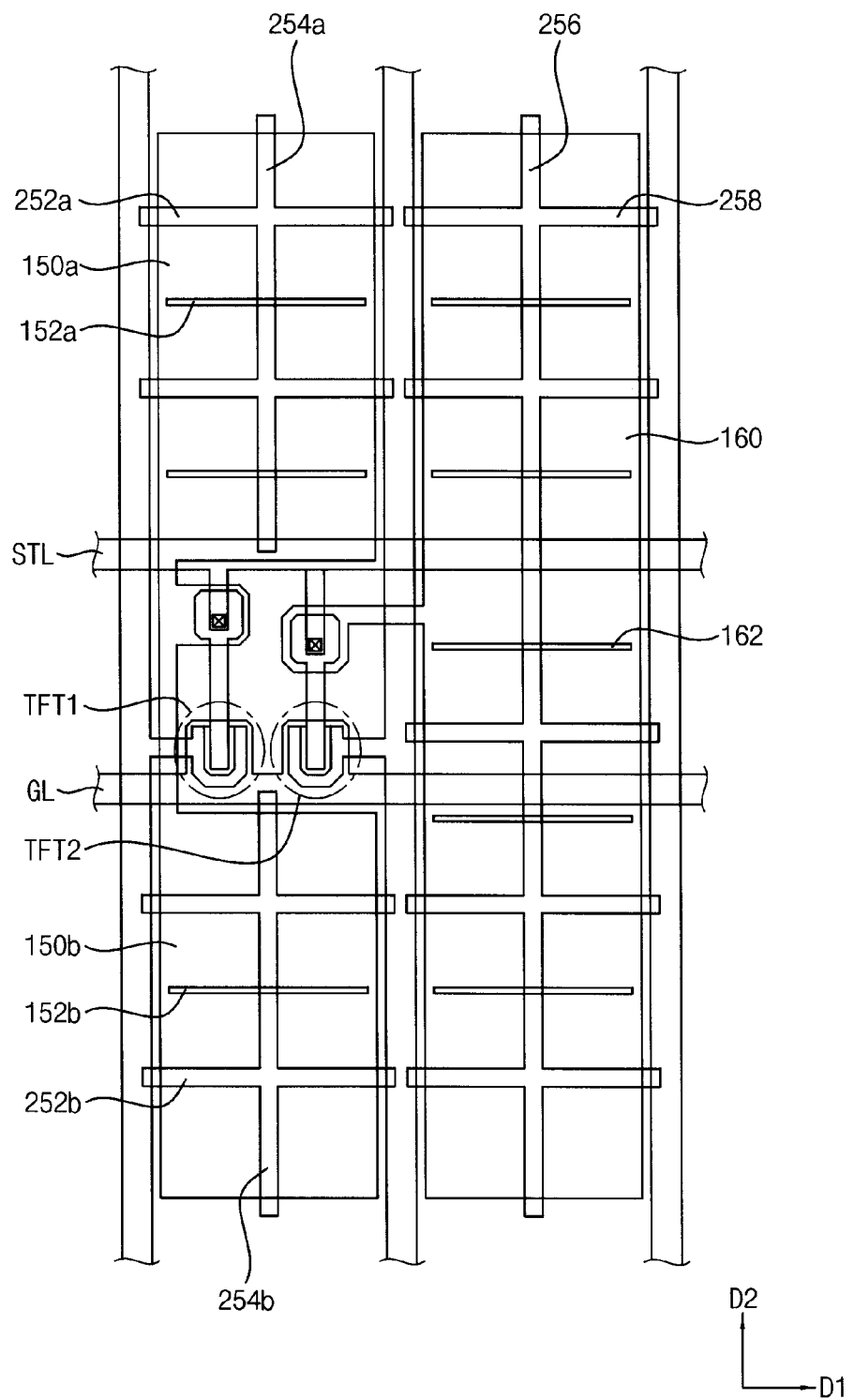
FIG. 11 is a plan view illustrating another exemplary embodiment of a unit pixel of a display panel according to the invention.

FIG. 11 is a plan view illustrating a unit pixel of a display panel according to another exemplary embodiment of the invention.

Referring to FIG. 11, a display panel is substantially same as a display panel of FIG. 1 except for positions of first and second thin film transistor TFT1 and TFT2, and first and second portions 150a and 150b of a first pixel electrode. Thus, any further detailed descriptions concerning the same elements will be briefly explained or omitted.

The display panel includes a first thin film transistor TFT1 connected to a gate line GL and a first data line DL1, a second thin film transistor TFT2 connected to the gate line GL and a second data line DL2, a first pixel electrode 150a and 150b, a second pixel electrode 160 and a common electrode 250 (refers to FIG. 1). The first pixel electrode includes a first portion 150a and a second portion 150b. The second data line DL2 is disposed between the first pixel electrode and the second pixel electrode 160. Thus, the collective first pixel electrode 150a and 150b, and the second pixel electrode 160 are separated by the second data line DL2.

The first portion 150a of the first pixel electrode is disposed adjacent to the first thin film transistor TFT1. The second portion 150b is disposed opposite to the first portion 150a with reference to the first thin film transistor TFT1. The first and second portions 150a and 150b are electrically connected each other. A plurality of slit openings 152a is defined in the first portion 150a. A plurality of slit openings 152b is defined in the second portions 150b.

A first slit opening line 254a corresponding to the first portion 150a of the first pixel electrode and a plurality of slit openings 252a crossing the first slit opening line 254a are defined in the common electrode 250. In addition, a first slit opening line 254b corresponding to the first portion 150b of the first pixel electrode and a plurality of slit openings 252b crossing the first slit opening line 254b are defined in the common electrode 250.

Although the unit pixel of the display panel includes the first pixel electrode having the first portion 150a and the second portion 150b and the second pixel electrode 160 in the illustrated exemplary embodiment, the unit pixel of the display panel may be divided into a first and second pixels PL1 and PL2 by the second data line DL2 (refer to FIG. 1), and each of the first and second pixels PL1 and PL2 may be divided into a plurality of domains having various shapes by the slit openings of the first pixel electrode PL1, the slit openings of the second pixel electrode PL2, and the slit opening line and the slit openings of the common electrode 250.

Figure 12:
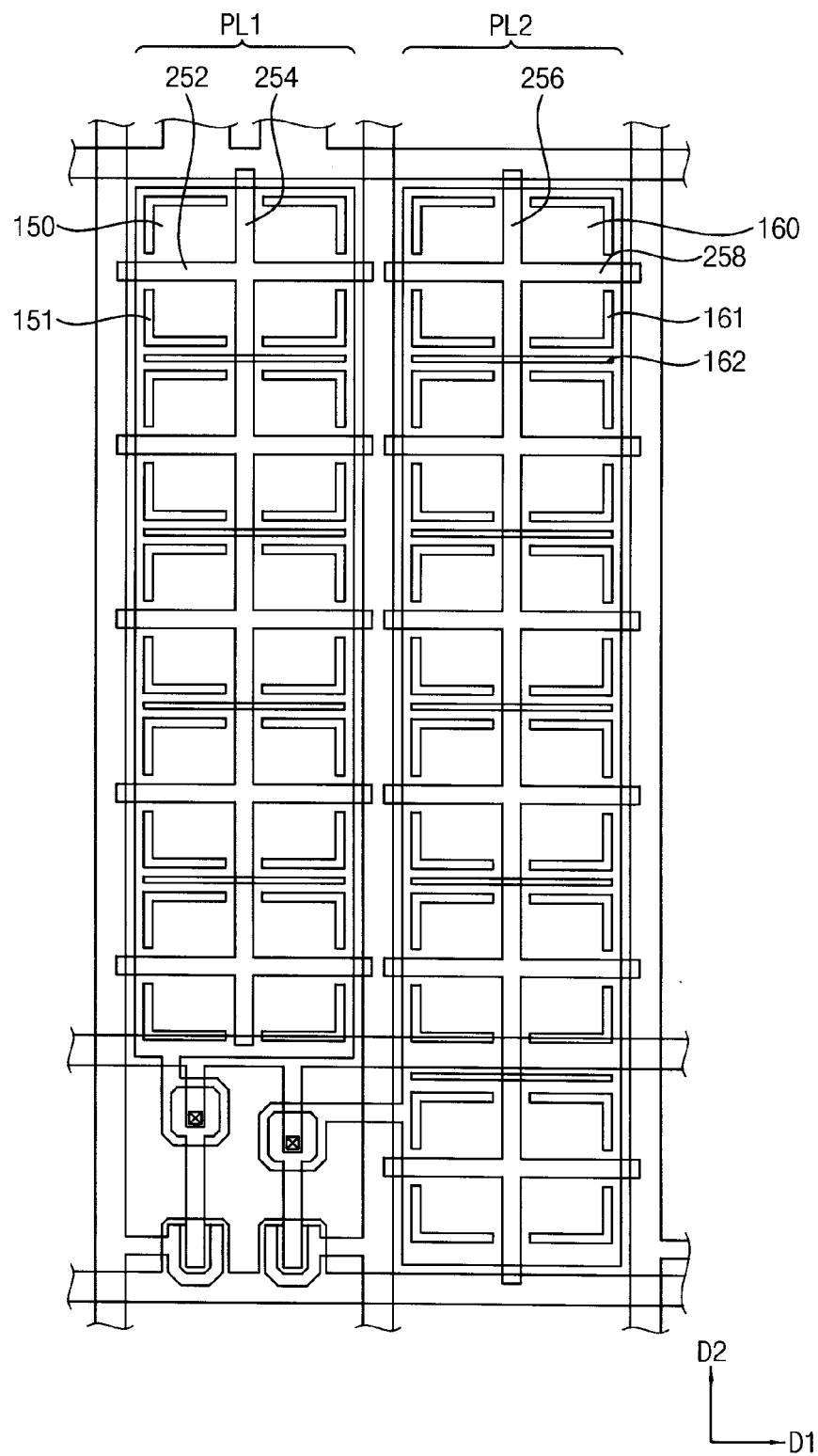
FIG. 12 is a plan view illustrating another exemplary embodiment of a unit pixel of a display panel according to the invention.

FIG. 12 is a plan view illustrating a unit pixel of a display panel according to another exemplary embodiment of the invention.

Referring to FIG. 12 a display panel is substantially same as a display panel of FIG. 1 except for edge openings 151 and 161 of first and second pixel electrodes. Thus, any further detailed descriptions concerning the same elements will be briefly explained or omitted.

The unit pixel of the display panel includes a first pixel PL1 and a second pixel PL2 divided by a second data line DL2 (refer to FIG. 1). The unit pixel of display panel includes a first pixel electrode 150 corresponding to the first pixel PL1, and a second pixel electrode 160 corresponding to the second pixel PL2.

A plurality of edge openings 151 is defined in the first pixel electrode 150. The edge openings 151 may be provided corresponding to each of domains (refer to FIG. 8). Each of the edge openings 151 may have an L-shape corresponding to a boundary of a unit domain. The edge openings 151 may protect liquid crystal molecules corresponding to the boundary of the unit domain from being irregularly arranged, so that a transmittance may be improved.

According to the invention, a display panel includes a first pixel electrode and a second pixel electrode divided by a second data line, so that a first data line of an adjacent pixel may be disposed adjacent to the second pixel electrode. In addition, a plurality of slit openings or a slit opening line may be defined in the first pixel electrode, the second pixel electrode and a common electrode. Thus, an aperture ratio and a transmittance of the display panel may be improved.

In addition, the display panel includes the first and second pixel electrode to which different voltages are applied, so that displaying quality of the display panel may be improved.

In addition, the display panel includes first to fourth domains having different director directions, so that so that the displaying quality of the display panel may be improved.

In addition, a plurality of edge openings may be defined in the first and second pixel electrodes, so that so that the displaying quality of the display panel may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display panel comprising:
   a gate line;
   a first data line crossing the gate line, and to which a first voltage is applied;
   a second data line in parallel with and contiguous to the first data line and spaced apart from the first data line, and to which a second voltage different from the first voltage is applied;
   a first thin film transistor electrically connected to the first data line;
   a second thin film transistor electrically connected to the second data line;
   a first pixel electrode electrically connected to the first thin film transistor and disposed between the first data line and the second data line;
   a second pixel electrode electrically connected to the second thin film transistor and disposed opposite to the first pixel electrode with reference to the second data line;
   a common electrode overlapping the first and second pixel electrodes,
   wherein a first slit opening line corresponding to the first pixel electrode and extending in the length direction of the second data line and a second slit opening line corresponding to the second pixel electrode and extending in the length direction of the second data line, are defined in the common electrode.

2. The display panel of claim 1, wherein
   a plurality of slit openings is defined the first pixel electrode and arranged in a length direction of the second data line; and
   a plurality of slit openings is defined in the second pixel electrode and arranged in the length direction of the second data line.

3. The display panel of claim 1, wherein a plurality of first slit openings disposed between the plurality of slit openings of the first pixel electrode and a plurality of second slit openings disposed between the plurality of slit openings of the second pixel electrode, are defined in the common electrode.

4. The display panel of claim 3, wherein a third slit opening line overlapping the second data line is defined in the common electrode.

5. The display panel of claim 3, wherein
   a first pixel is defined by an area of the first pixel electrode, and a second pixel is defined by an area of the second pixel electrode,
   the first pixel comprises a plurality of domains divided by the plurality of slit openings of the first pixel electrode, the first slit opening line of the common electrode and the plurality of first slit openings of the common electrode, and
   the second pixel comprises a plurality of domains divided by the plurality of slit openings of the second pixel electrode, the second slit opening line of the common electrode and the plurality of second slit openings of the common electrode.

6. The display panel of claim 5, wherein
   the first pixel is divided into a plurality of unit domains by the plurality of slit openings of the first pixel electrode, and
   the second pixel is divided into a plurality of unit domains by the plurality of slit openings of the second pixel electrode.

7. The display panel of claim 6, further comprising a liquid crystal layer comprising liquid crystal molecules and disposed between the first and second pixel electrodes, and the common electrode, respectively,
   wherein
   a unit domain of the first pixel is divided into first to fourth domains by the first slit opening line and the plurality of first slit openings of the common electrode,
   a unit domain of the second pixel is divided into first to fourth domains by the second slit opening line and the plurality of second slit openings of the common electrode, and
   director directions of liquid crystal molecules in each of the first to fourth domains of the unit domain of the first pixel are different from each other, or director directions of liquid crystal molecules in each of the first to fourth domains of the unit domain of the second pixel are different from each other.

8. The display panel of claim 7, wherein the director directions of the first to fourth domains of the unit domain of the first pixel are changed in counter clock wise in an order of the first to fourth domains of the unit domain of the first pixel, or the director directions of each of the first to fourth domains of the unit domain of the second pixel are changed in counter clock wise in an order of the first to fourth domains of the unit domain of the second pixel.

9. The display panel of claim 7, wherein each of the first to fourth domains has a square shape.

10. The display panel of claim 5, wherein a plurality of edge openings corresponding to each of the domains is further defined in the first and second pixel electrodes.

11. The display panel of claim 3, wherein
the second data line is spaced apart from a center of a unit pixel toward the first data line, and
an area of the first pixel electrode and an area of the second pixel electrode are different from each other.

12. The display panel of claim 11, wherein an area ratio of the first pixel electrode and the second pixel electrode is about 1:1.5 to about 1:2.

13. The display panel of claim 3, wherein
the first pixel electrode comprises a first portion adjacent to the first thin film transistor, and a second portion opposite to the first portion with reference to the first thin film transistor, and
the first portion and the second portions of the first pixel electrode are electrically connected each other.

14. The display panel of claim 3, wherein the first slit opening line and the plurality of first slit openings of the common electrode have a cross (+) shape.

15. The display panel of claim 1, wherein the first voltage is lower than the second voltage.

16. The display panel of claim 1, wherein the second pixel electrode is disposed adjacent to the first data line of an adjacent unit pixel.

17. A method of manufacturing a display panel, the method comprising:

forming a first data line, and a second data line in parallel with and contiguous to the first data line, on a first base substrate;
forming a first thin film transistor electrically connected to the first data line, and a second thin film transistor electrically connected to the second data line;
forming a first pixel electrode electrically connected to the first thin film transistor, and a second pixel electrode electrically connected to the second thin film transistor, the first pixel electrode disposed between the first data line and the second data line, the second pixel electrode being opposite to the first pixel electrode with reference to the second data line;
forming a common electrode on a second base substrate; and
forming a liquid crystal layer between the first and second pixel electrodes, and the common electrode, respectively,
wherein the forming the common electrode comprises:
forming a transparent conductive layer on the second base substrate; and
defining a first slit opening line overlapping the first pixel electrode, a plurality of first slit openings crossing the first slit opening line, a second slit opening line overlapping the second pixel electrode, and a plurality of second slit openings crossing the second slit opening line in the common electrode by patterning the transparent conductive layer.

18. The method of claim 17, wherein the forming the first and second pixel electrodes comprises:
forming a transparent conductive layer on the first base substrate including the first and second data lines and the first and second thin film transistor thereon; and
defining slit openings in the first and second pixel electrodes by patterning the transparent conductive layer.

* * * * *